(12) United States Patent
Zhang et al.

(10) Patent No.: US 12,344,684 B2
(45) Date of Patent: Jul. 1, 2025

(54) MICRO-INTERFACE STRENGTHENING REACTION SYSTEM AND METHOD FOR PREPARING POLY-α-OLEFIN

(71) Applicant: NANJING YANCHANG REACTION TECHNOLOGY RESEARCH INSTITUTE CO., LTD., Nanjing (CN)

(72) Inventors: Zhibing Zhang, Nanjing (CN); Zheng Zhou, Nanjing (CN); Feng Zhang, Nanjing (CN); Lei Li, Nanjing (CN); Weimin Meng, Nanjing (CN); Baorong Wang, Nanjing (CN); Gaodong Yang, Nanjing (CN); Huaxun Luo, Nanjing (CN); Guoqiang Yang, Nanjing (CN); Hongzhou Tian, Nanjing (CN); Yu Cao, Nanjing (CN)

(73) Assignee: NANJING YANCHANG REACTION TECHNOLOGY RESEARCH INSTITUTE CO., LTD., Nanjing (CN)

( * ) Notice: Subject to any disclaimer, the term of this patent is extended or adjusted under 35 U.S.C. 154(b) by 573 days.

(21) Appl. No.: 17/788,749

(22) PCT Filed: Jun. 18, 2020

(86) PCT No.: PCT/CN2020/096737
§ 371 (c)(1),
(2) Date: Jun. 24, 2022

(87) PCT Pub. No.: WO2021/253310
PCT Pub. Date: Dec. 23, 2021

(65) Prior Publication Data
US 2023/0043644 A1    Feb. 9, 2023

(30) Foreign Application Priority Data
Jun. 17, 2020   (CN) .......................... 202010554334.9

(51) Int. Cl.
C08F 2/01    (2006.01)
C08F 6/00    (2006.01)

(52) U.S. Cl.
CPC ................ *C08F 2/01* (2013.01); *C08F 6/005* (2013.01)

(58) Field of Classification Search
USPC .......................................................... 526/65
See application file for complete search history.

(56) References Cited

U.S. PATENT DOCUMENTS

2014/0163183 A1 *  6/2014  Jiang ..................... C08F 210/18
526/348

FOREIGN PATENT DOCUMENTS

| CN | 102015787 A |   | 4/2011  |              |
|----|-------------|---|---------|--------------|
| CN | 106215730 A | * | 12/2016 | .......... B01F 23/2319 |
| CN | 210176791 U |   | 3/2020  |              |

OTHER PUBLICATIONS

Machine-generated English language translation of CN 210176791U, retrieved from ESPACENET on Mar. 5, 2025. (Year: 2020).*

(Continued)

*Primary Examiner* — Fred M Teskin
(74) *Attorney, Agent, or Firm* — Chun-Ming Shih; LANWAY IPR SERVICES

(57) ABSTRACT

The invention discloses a micro-interface strengthening reaction system for preparing poly-α-olefin, which includes: a first polymerization reactor and a second polymerization reactor that are connected with each other in sequence, wherein a first micro-interface generator is disposed outside the first polymerization reactor, and a second micro-interface generator is disposed inside the second polymerization reactor. A bottom of the second polymerization reactor is provided with a discharge port, and the discharge port is connected with a hydrogen halide removal tower. By disposing the first micro-interface generator in the first polym- (Continued)

erization reactor while disposing the second micro-interface generator in the second polymerization reactor, on the one hand it increases the mass transfer area between the gas phase and the liquid phase material, improves reaction efficiency and reduces energy consumption, and on the other hand it results in a higher evenness of the poly-α-olefin and improved product quality.

9 Claims, 1 Drawing Sheet

(56) References Cited

OTHER PUBLICATIONS

Machine-generated English language translation of CN 110016090A, retrieved from ESPACENET on Mar. 5, 2025. (Year: 2019).*
Machine-generated English language translation of CN 106215730A, retrieved from ESPACENET on Mar. 5, 2025. (Year: 2016).*

* cited by examiner

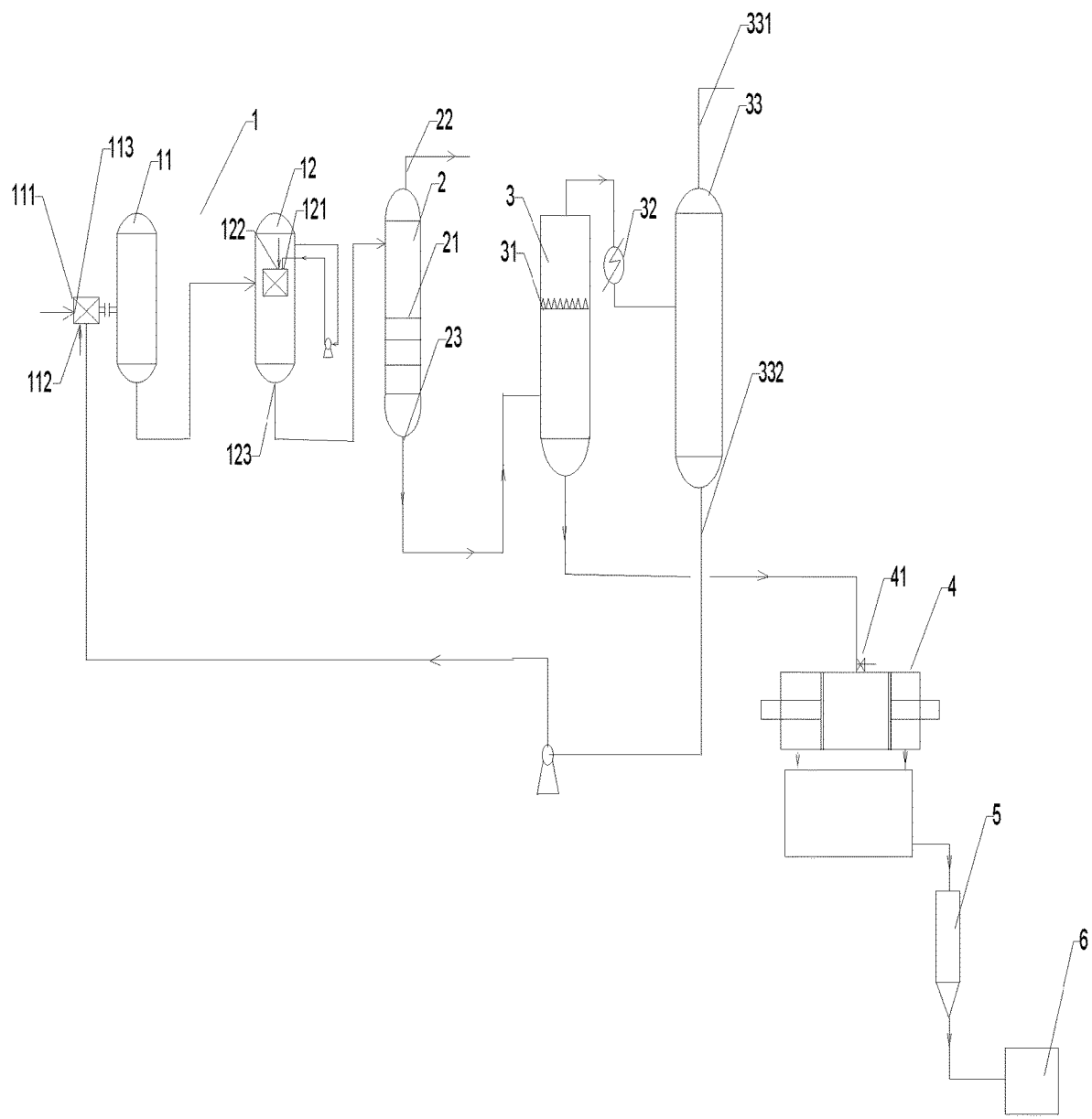

MICRO-INTERFACE STRENGTHENING REACTION SYSTEM AND METHOD FOR PREPARING POLY-α-OLEFIN

FIELD OF THE INVENTION

The present invention relates to the technical field of preparing poly-α-olefin, in particular to a micro-interface strengthening reaction system and method for preparing poly-α-olefin.

BACKGROUND OF THE INVENTION

Poly-α-olefin is a kind of synthetic base oil. Poly-α-olefin is made by further polymerizing and hydrogenating alphaolefin produced by the polymerization of ethylene. It is the most commonly used synthetic lubricant base oil and has the widest range of applications. Poly-α-olefin synthetic oil has good viscosity-temperature properties and low-temperature fluidity, and is an ideal base oil for preparing high-grade and special-purpose lubricating oils.

During the production process of poly-α-olefin, stirred bed reactors, tank reactors, tubular reactors, tower reactors, etc. are usually used as polymerization reactors, which however provide limited phase boundary area and mass transfer coefficient. The gas utilization rate is low and the reaction efficiency is low, so it is difficult to achieve a breakthrough improvement in the reaction performance, which in turn affects the overall efficiency of the reaction. In addition, the uneven mixing between the gas and the liquid phase leads to an uneven distribution of molecular weight, and a low uniformity of the obtained poly-α-olefin, thereby affecting the quality of the product.

SUMMARY OF THE INVENTION

In view of this, the invention provides a micro-interface strengthening reaction system for preparing poly-α-olefin and a method therefor. A first objective is to provide the micro-interface strengthening reaction system for preparing poly-α-olefin. By disposing a first micro-interface generator within a first polymerization reactor while disposing a second micro-interface generator within a second polymerization reactor, on the one hand it increases the mass transfer area between the gas phase and the liquid phase material, has a high gas utilization rate, improves the reaction efficiency and reduces the energy consumption, and on the other hand it results in more even mixing of the gas and the liquid phase, more even distribution of the molecular weight of the obtained poly-α-olefin and improved product quality.

A second objective is to provide a reaction method for preparing poly-α-olefin using the above micro-interface strengthening reaction system, wherein the temperature and the energy consumption required for the reaction are low, and the poly-α-olefin product obtained by the reaction has good quality and high yield.

In order to realize the above-mentioned objectives of the present invention, the following technical schemes are specially adopted.

The present invention discloses a micro-interface strengthening reaction system for preparing poly-α-olefin, including a first polymerization reactor and a second polymerization reactor that are connected with each other in sequence, wherein a first micro-interface generator for dispersing and breaking into microbubbles is disposed outside the first polymerization reactor, and a second micro-interface generator for dispersing and breaking into microbubbles is disposed inside the second polymerization reactor. A bottom portion of the second polymerization reactor is provided with a discharge port, and the discharge port is connected with a hydrogen halide removal tower to remove by-products formed by a reaction of a catalyst and a hydrogen during the reaction; the hydrogen halide removal tower has a top portion provided with a first exhaust pipe for exhausting a hydrogen halide gas, and has a bottom portion provided with a separation product outlet for exhausting poly-α-olefin products. The separation product outlet is connected with a flash tank for flash purification and separation of the poly-α-olefin products, so that separated hydrogen and a circulating material are exhausted from a top portion of the flash tank, and separated poly-α-olefin is discharged from a bottom portion of the flash tank to enter a molecular sieve refiner for removing a moisture of the poly-α-olefin.

Further, a first side wall of the first micro-interface generator is provided with a feed port for introducing an alpha olefin raw material, and a second side wall of the first micro-interface generator is connected with the first polymerization reactor. A bottom end of the first micro-interface generator is further provided with a first inlet, and the first inlet is used for introducing a halide catalysts, the hydrogen and an organic solvent.

Further, a top end of the second micro-interface generator is provided with a second inlet for introducing the halide catalysts, the hydrogen and the organic solvent, the second micro-interface generator is connected with one end of a liquid phase circulating pipeline, and another end of the liquid phase circulating pipeline is connected with a side wall of the second polymerization reactor.

Further, the top portion of the flash tank is connected with a condenser for liquefying the circulating material.

Further, the condenser is connected with a side wall of a gas liquid separation tank, and a top portion of the gas liquid separation tank is provided with a second exhaust pipe for exhausting the hydrogen; an outlet of a bottom portion of the gas liquid separation tank is connected with a circulating pipe for circulating the circulating material into the first micro-interface generator, and the circulating pipe is provided with a delivery pump.

Further, the molecular sieve refiner is connected with a hopper for collecting the poly-α-olefin, and the hopper is connected with a collection container.

A micro-interface strengthening reaction method for preparing poly-α-olefin using the micro-interface strengthening reaction system, includes steps of:

mixing, dispersing and breaking reaction raw materials, catalysts and solvents into microbubbles for polymerization reaction, then removing impurities and performing flash evaporation, and finally drying.

Further, a temperature of the polymerization reaction is 120-132° C.

Further, a pressure of the polymerization reaction is 1-1.2 MPa.

Those skilled in the art can understand that the micro-interface generator used in the present invention has been embodied in the inventor's previous patents, such as patents with application numbers CN201610641119. Patents of CN205833127U and CN207581700U. In the previous patent CN201610641119.6, the specific product structure and working principle of the micro-bubble generator (that is, the micro-interface generator) were introduced in detail. The application document states that "the micro-bubble generator includes a main body and a secondary crushing part, the main body has a cavity, the main body is provided with an inlet that communicates with the cavity, and opposite first and second ends of the cavity are open, wherein a cross-sectional area of the cavity decreases form the middle of the cavity to the first and second sends of the cavity. The secondary crushing part is arranged at least one of the first and second ends of the cavity, and a part of the secondary crushing part is arranged within the cavity, and an annular channel is formed between the secondary crushing part and through holes opened at both ends of the cavity. The micro-bubble generator further includes a gas inlet pipe and a liquid inlet pipe." From the specific structure disclosed in this application document, it can be known that its specific working principle is: the liquid enters the micro-bubble generator tangentially through the liquid inlet pipe, rotates and cuts the gas at an ultra-high speed, and breaks the gas bubbles into micro-level micro-bubbles. Thus, the mass transfer area between the liquid phase and the gas phase is increased, and the micro-bubble generator in this patent belongs to a pneumatic micro-interface generator.

In addition, the previous patent 201610641251.7 states that a primary bubble breaker has a circulating liquid inlet, a circulating gas inlet and a gas-liquid mixture outlet, and the secondary bubble breaker communicates the feed port with the gas-liquid mixture outlet, indicating that the bubble breaker needs the gas and the liquid to be mixed and entered. Moreover, it can be seen from the following drawings that the primary bubble breaker mainly uses the circulating liquid as the power, in fact, the primary bubble breaker belongs to the hydraulic micro-interface generator, and the secondary bubble breaker is to pass the gas-liquid mixture into the ellipse at the same time. It rotates in the shape of the rotating ball, so that the bubbles are broken during rotations, so the secondary bubble breaker is actually a gas-liquid linkage micro-interface generator. In fact, both the hydraulic micro-interface generator and the gas-liquid linkage micro-interface generator belong to a specific form of micro-interface generators. However, the micro-interface generators used in the present invention are not limited to the above-mentioned types, the specific structure of the bubble breaker described in the previous patents is only one of the types of the micro-interface generator adopted in the present invention.

Moreover, the previous patent 201710766435.0 stated that "the principle of the bubble breaker is to achieve high-speed jets to achieve gas collision", and also stated that it can be used in micro-interface strengthening reactors to verify the relationship between the bubble breaker and the micro-interface generator. The previous patent CN106187660 also has related records on the specific structure of the bubble breaker. For details, see paragraphs [0031]-[0041] in the description and the accompanying drawings. It has a detailed description of the specific working principle of the bubble breaker S-2. The liquid phase inlet is disposed at the top of the bubble breaker, and a gas phase inlet is located at the side wall of the bubble breaker. The liquid phase entering from the top of the bubble breaker provides the entrainment power, so as to crush into ultra-fine bubbles. It can also be seen in the drawings that, the bubble breaker has a conical structure, and the diameter of the upper portion is larger than the diameter of the lower portion, so that the liquid phase can provide entrainment power more easily.

Since the micro-interface generator was just developed in the early stage of the previous patent application, it was named as micro-bubble generator ((CN201610641119.6), bubble breaker (201710766435.0), etc., and later its name is changed to micro-interface generator with continuous technological improvement. The micro-interface generator in the present invention is equivalent to the previous micro-bubble generator, bubble breaker, etc., although their names are different.

To sum up, the micro-interface generator of the present invention belongs to the prior art, although some bubble breakers belong to the pneumatic bubble breakers, some belong to the hydraulic bubble breakers, and some belong to the gas-liquid linkage bubble breakers, however, the difference between the types of bubble breakers is mainly selected based on specific working conditions. Furthermore, the connection between the micro-interface generator and the reactor and other devices, including the connection structure and the connection position, depends on the structure of the micro-interface generator. This is not limited.

Compared with the prior art, the invention has the following beneficial effects: the micro-interface strengthening reaction system for preparing poly-α-olefin of the invention, by disposing the first micro-interface generator in the first polymerization reactor while disposing the second micro-interface generator in the second polymerization reactor, on the one hand increases the mass transfer area between the gas phase and the liquid phase material, improves the reaction efficiency and reduces the energy consumption, and on the other hand results in more even mixing of the gas and the liquid phase, a higher evenness of the obtained poly-α-olefin and improved product quality.

BRIEF DESCRIPTION OF THE DRAWINGS

Upon reading the following detailed description of preferred embodiments, various advantages and benefits will be apparent to those of ordinary skill in the art. The drawings are for the purpose of explaining preferred embodiments only, and do not constitute improper limitations on the present invention. The same components are also denoted by the same reference numerals throughout the drawings. In the drawings:

The drawing is a structural diagram of a reaction system for preparing poly-α-olefin according to an embodiment of the present invention.

DESCRIPTION OF THE PREFERRED EMBODIMENTS

The technical schemes of the present invention will be clearly and completely described below with reference to the accompanying drawings and specific embodiments, but those skilled in the art will understand that the embodiments described below are part of the embodiments of the present invention, rather than all of the embodiments. It is only used to illustrate the present invention and should not be construed as limiting the scope of the present invention. Based on the embodiments of the present invention, all other embodiments obtained by those of ordinary skill in the art without creative efforts shall fall within the protection scope of the present invention. If the specific conditions are not indicated in the examples, it is carried out according to the conventional conditions or the conditions suggested by the manufacturer. The reagents or instruments used without the manufacturer's indication are conventional products that can be purchased from the market.

In the description of the present invention, it should be noted that the terms such as "center", "upper", "lower", "left", "right", "vertical", "horizontal", "inner", "outer", etc., the indicated orientation or positional relationship is based on the orientation or positional relationship shown in the accompanying drawings, which is only for the convenience of describing the present invention and simplifying the description, rather than indicating or implying that the indicated device or element must have a specific orientation or a specific orientation, construction and operation, and therefore should not be construed as limiting the invention. Furthermore, the terms such as "first", "second", and "third" are used for descriptive purposes only and should not be construed to indicate or imply relative importance.

In the description of the present invention, it should be noted that the terms such as "installed", "connected" and "coupled" should be understood in a broad sense, unless otherwise expressly specified and limited, for example, it can be a fixed connection, a detachable connection or an integral connection; or it can be a mechanical connection or an electrical connection; or it can be directly connected or indirectly connected through an intermediate medium, or it can be internal communication between two elements. For those of ordinary skill in the art, the specific meanings of the above terms in the present invention can be understood in specific situations.

With reference to The drawing, a reaction system for preparing poly-α-olefin according to an embodiment of the invention is shown. The system includes a first polymerization reactor 11 and a second polymerization reactor 12 that are connected with each other in sequence, wherein a first micro-interface generator 111 for dispersing and breaking into microbubbles is disposed outside the first polymerization reactor 11, and a second micro-interface generator 121 for dispersing and breaking into microbubbles is disposed inside the second polymerization reactor 12. A bottom portion of the second polymerization reactor 12 is provided with a discharge port 123, and the discharge port 123 is connected with a hydrogen halide removal tower 2 to remove by-products formed by a reaction of a catalyst during the reaction. The hydrogen halide removal tower 2 has a top portion provided with a first exhaust pipe 22 for exhausting a hydrogen halide gas, and has a bottom portion provided with a separation product outlet 23 for exhausting poly-α-olefin products. The separation product outlet 23 is connected with a flash tank 3 for flash purification and separation of the poly-α-olefin products, so that separated hydrogen and a circulating material are exhausted from a top portion of the flash tank 3, and separated poly-α-olefin is discharged from a bottom portion of the flash tank 3 to enter a molecular sieve refiner 4 for removing a moisture of the poly-α-olefin.

Specifically, the first micro-interface generator 111 functions as mixing alpha olefin raw materials, halide catalysts, the hydrogen and an organic solvent and dispersing and breaking the above substances into microbubbles, and the alpha olefin raw materials, the halide catalysts, the hydrogen and the organic solvent are fully emulsified in the first polymerization reactor 11 and then undergo a polymerization reaction to form a first polymer. The second micro-interface generator 121 functions as mixing the first polymer, the halide catalysts, the hydrogen and the organic solvent and dispersing and breaking the above substances into microbubbles, and the first polymer, the halide catalysts, the hydrogen and the organic solvent are fully emulsified in the second polymerization reactor 12 and then undergo a polymerization reaction to form a polymerized reaction product.

In this embodiment, the type of the alpha olefin raw material is not limited, as long as it can achieve the preparation of poly-α-olefin, and it may be selected from one or a mixture of ethylene, propylene, alpha butene, alpha hexene, etc. If gaseous substances such as ethylene, propylene, α-butene, etc. are added, they are directly introduced into the first micro-interface generator; if a liquid substance such as α-hexene is added, the α-hexene and the like may be vaporized into a gaseous state and introduced into the first micro-interface generator 111.

The type of the halide catalyst is not limited, and is selected from the halide of the VIB group transition metal, halogen oxide, etc., such as TiCl4, TiCl3, VOI3, VOCl3, etc. By adding the halide catalyst into the first micro-interface generator 111 and the second micro-interface generator 121, the efficiency of the polymerization reaction may be improved, so that the obtained poly-α-olefin has higher uniformity and improved product quality.

Specifically, a first side wall of the first micro-interface generator 111 is provided with a feed port 113 for introducing the alpha olefin raw material, and a second side wall of the first micro-interface generator 111 is connected with the first polymerization reactor 11. The first micro-interface generator 111 is further provided with a first inlet 112 for introducing the halide catalysts, the hydrogen and the organic solvent, and the second micro-interface generator 121 is provided with a second inlet 122 for introducing the halide catalysts, the hydrogen and the organic solvent. The first micro-interface generator 111 is a pneumatic micro-interface generator.

The second micro-interface generator 121 is a hydraulic micro-interface generator, and the second micro-interface generator 121 is connected with a liquid phase circulating pipeline for powering the second micro-interface generator 121. The liquid phase circulating pipeline has one end connected with a side wall of the second polymerization reactor 12, and has the other end connected with the second micro-interface generator 121.

The number of the first micro-interface generator 111 and the second micro-interface generator 121 is at least one.

Specifically, a bottom portion of the second polymerization reactor 12 is provided with a discharge port 123, and the discharge port 123 is connected with a hydrogen halide removal tower 2 to remove by-products formed by a reaction of a catalyst during the reaction. A middle portion of the hydrogen halide removal tower 2 is provided with a hydrogen halide adsorption layer 21, and the hydrogen halide adsorption layer 21 is set to several layers, as long as it may absorb the hydrogen halide in the polymerized reaction product and convert the hydrogen halide into hydrogen halide gas. The hydrogen halide removal tower 2 has a top portion provided with a first exhaust pipe 22 for exhausting the hydrogen halide gas, and the hydrogen halide removal tower 2 has a bottom portion provided with a separation product outlet 23; the separation product outlet 23 is connected with a flash tank 3.

In this embodiment, the number of the hydrogen halide adsorption layers 21 is set to three, which are arranged horizontally to each other, so as to prevent the cost from being too high due to too many hydrogen halide adsorption layers 21 and avoid incomplete removal of the hydrogen halide due to too little hydrogen halide adsorption layer 21.

Further, the separation product outlet 23 is connected with a flash tank 3 for flash evaporation of the polymerized reaction product, and a middle of the flash tank 3 is provided with a resistance wire 31. Any number of the resistance wire 31 may be set, as long as the flash distillation of the polymerized reaction product is ensured. The flash tank has a bottom portion connected with the molecular sieve refiner 4, and has a top portion connected with the condenser 32.

In this embodiment, the number of the resistance wire 31 is one, and the flash tank 3 performs flash evaporation of the polymerized reaction product to separate into the hydrogen, the circulating material and the poly-α-olefin. The hydrogen and the circulating material flow into the condenser 32 through the outlet at the top portion for subsequent treatment, and the poly-α-olefin enters the molecular sieve refiner 4 through the outlet of the flash tank 3 at the bottom portion for drying process. The pipeline between which the separation product outlet 23 is connected with the flash tank 3 is further provided with a pressure reducing valve and heater, so that heating is performed before flash evaporation to improve the efficiency of flash evaporation. The pressure reducing valve is preferably a pressure reducing valve of membrane type. Compared with other pressure reducing valves, the pressure reducing valve of membrane type is more sensitive to pressure, and the accuracy is higher than ±1%. The circulating material includes the alpha olefin raw material, the halide catalyst and the organic solvent.

Further, the condenser 32 is connected with a gas liquid separation tank 33 for liquefying the condensed hydrogen and circulating material, and an upper portion of the gas liquid separation tank 33 is provided with a second exhaust pipe 331 for exhausting the hydrogen. The circulating material in a liquid state is returned to the first micro-interface generator 111 through a connecting circulating pipe 332 on a lower portion of the gas liquid separation tank 33 for recycling, which increases the utilization rate of reaction raw materials. The circulating pipe 332 is provided with a delivery pump.

Further, the molecular sieve refiner 4 is connected with the flash tank 3 for drying the poly-α-olefin. A top portion of the molecular sieve refiner 4 is provided with a valve 41 for controlling the incoming amount of the poly-α-olefin.

In the above embodiment, a hopper 5 is further included. A bottom portion of the hopper 5 is connected with a collection container 6 for collecting the poly-α-olefin from the bottom of the hopper into the collection container 6.

The working process and principle of the reaction system for preparing poly-α-olefin of the invention are briefly described below.

The alpha olefin raw material introduced through the feed port 113 and the hydrogen, the halide catalyst and the organic solvent introduced through the first inlet 112 are mixed in the first micro-interface generator 111 and dispersed and broken into microbubbles, then the dispersed and broken microbubbles are fully emulsified and undergo the polymerization reaction to form the first polymer. The first polymer, the halide catalyst, the hydrogen and the organic solvent are introduced into the second micro-interface generator 121, broken into the microbubbles by the second micro-interface generator 121 and fully emulsified, and then introduced into the second polymerization reactor 12 for polymerization reaction. The polymerized reaction products then are introduced into the hydrogen halide removal tower 2 for removing the hydrogen halide, and the hydrogen halide gas is a by-product formed by the reaction of the catalyst with the hydrogen, wherein the hydrogen halide gas is exhausted from the first exhaust pipe 22 at the top portion of the hydrogen halide removal tower 2, and the poly-α-olefin product from the outlet of the bottom portion of the hydrogen halide removal tower is introduced into the flash tank 3 for flash evaporation; the flashed hydrogen and circulating materials are introduced into the condenser 32 through the outlet of the top portion of the flash tank 3 to liquefy the circulating materials, which include alpha olefin raw material, the halide catalyst and the organic solvent. The hydrogen and the liquefied circulating materials are separated through the gas liquid separation tank 33, wherein the hydrogen is exhausted from the second exhaust pipe 331 provided at the top portion of the gas liquid separation tank 33, the liquefied circulating materials introduce the circulating materials into the first micro-interface generator 111 through the circulating pipe 332 for recycling, and the poly-α-olefin product is introduced into the molecular sieve refiner 4 through the outlet at the bottom portion of the flash tank 3 for removing the moisture. The moisture-removed poly-α-olefin is introduced the collection container 6 through the hopper 5. The type of the halide catalyst is not limited, and may be selected from the halide of the VIB group transition metal, halogen oxide, etc.

Therefore, the micro-interface strengthening reaction system for preparing poly-α-olefin of the invention, by disposing the first micro-interface generator 111 in the first polymerization reactor 11 while disposing the second micro-interface generator 121 in the second polymerization reactor 12, on the one hand increases the mass transfer area between the gas phase and the liquid phase material, has a higher gas utilization, improves the reaction efficiency and reduces the energy consumption, and on the other hand results in more even mixing of the gas and the liquid phase, a higher evenness of the obtained poly-α-olefin and improved product quality.

So far, those skilled in the art realize that although embodiments of the invention have been shown and described in detail herein, numerous other variations or modifications consistent with the principles of the invention may be directly determined or derived from the disclosure without departing from the spirit and scope of the invention. Accordingly, the scope of the invention should be understood and deemed to cover all such other variations or modifications.

The above descriptions are only preferred embodiments of the present invention, and are not intended to limit the present invention. For those skilled in the art, the present invention may have various modifications and changes. Any modification, equivalent replacement, improvement, etc. made within the spirit and principle of the present invention shall be included within the protection scope of the present invention.

What is claimed is:

1. A micro-interface strengthening reaction system for preparing poly-α-olefin, comprising:
    a first polymerization reactor and a second polymerization reactor that are connected with each other in sequence, wherein a first micro-interface generator for dispersing and breaking into microbubbles is disposed outside the first polymerization reactor, and a second micro-interface generator for dispersing and breaking into microbubbles is disposed inside the second polymerization reactor;
    a bottom portion of the second polymerization reactor is provided with a discharge port, and the discharge port is connected with a hydrogen halide removal tower to remove by-products formed by a reaction of a catalyst and a hydrogen during the reaction; the hydrogen halide removal tower has a top portion provided with a first exhaust pipe for exhausting a hydrogen halide gas, and has a bottom portion provided with a separation product outlet for exhausting poly-α-olefin products;
    the separation product outlet is connected with a flash tank for flash purification and separation of the poly-α-olefin products, so that separated hydrogen and a circulating material are exhausted from a top portion of the flash tank, and separated poly-α-olefin is discharged from a bottom portion of the flash tank to enter a molecular sieve refiner for removing a moisture of the poly-α-olefin.

2. The micro-interface strengthening reaction system for preparing poly-α-olefin according to claim 1, wherein a first side wall of the first micro-interface generator is provided with a feed port for introducing an alpha olefin raw material, and a second side wall of the first micro-interface generator is connected with the first polymerization reactor; a bottom end of the first micro-interface generator is further provided with a first inlet, and the first inlet is used for introducing the hydrogen and an organic solvent.

3. The micro-interface strengthening reaction system for preparing poly-α-olefin according to claim 2, wherein a top end of the second micro-interface generator is provided with a second inlet for introducing the hydrogen and the organic solvent, the second micro-interface generator is connected with one end of a liquid phase circulating pipeline, and another end of the liquid phase circulating pipeline is connected with a side wall of the second polymerization reactor.

4. The micro-interface strengthening reaction system for preparing poly-α-olefin according to claim 1, wherein the top portion of the flash tank is connected with a condenser for liquefying the circulating material.

5. The micro-interface strengthening reaction system for preparing poly-α-olefin according to claim 4, wherein the condenser is connected with a side wall of a gas liquid separation tank, and a top portion of the gas liquid separation tank is provided with a second exhaust pipe for exhausting the hydrogen; an outlet of a bottom portion of the gas liquid separation tank is connected with a circulating pipe for circulating the circulating material into the first micro-interface generator, and the circulating pipe is provided with a delivery pump.

6. The micro-interface strengthening reaction system for preparing poly-α-olefin according to claim 1, wherein the molecular sieve refiner is connected with a hopper for collecting the poly-α-olefin, and the hopper is connected with a collection container.

7. A micro-interface strengthening reaction method for preparing poly-α-olefin using the micro-interface strengthening reaction system according to claim 1, comprising steps of:
mixing, dispersing and breaking reaction raw materials, catalysts and solvents into microbubbles for polymerization reaction, then removing impurities and performing flash evaporation, and finally drying.

8. The micro-interface strengthening reaction method for preparing poly-α-olefin according to claim 7, wherein a temperature of the polymerization reaction is 120-132° C.

9. The micro-interface strengthening reaction method for preparing poly-α-olefin according to claim 7, wherein a pressure of the polymerization reaction is 1-1.2 MPa.

* * * * *